United States Patent [19]

Hannigan, Jr.

[11] 4,180,903
[45] Jan. 1, 1980

[54] APPARATUS FOR COLLAPSING STEAM TUBES FOR REMOVAL FROM A STEAM BOILER

[76] Inventor: Joseph Hannigan, Jr., 4407 Rhawn St., Philadelphia, Pa. 19136

[21] Appl. No.: 882,674

[22] Filed: Mar. 2, 1978

[51] Int. Cl.$^2$ ............................................. B21D 41/04
[52] U.S. Cl. ....................................... 29/727; 29/261; 72/402
[58] Field of Search ................. 29/259, 260, 261, 262, 29/263, 726, 727, 252; 72/402

[56] References Cited

U.S. PATENT DOCUMENTS

| | | | |
|---|---|---|---|
| 579,214 | 3/1897 | Adams | 72/402 |
| 1,393,026 | 10/1921 | Kepler | 29/261 |
| 3,073,374 | 1/1963 | Valente | 72/402 |
| 3,603,132 | 9/1971 | Holmes | 72/402 |
| 3,835,520 | 9/1974 | Sismore | 29/726 |

Primary Examiner—Lowell A. Larson
Attorney, Agent, or Firm—Seidel, Gonda, Goldhammer & Panitch

[57] ABSTRACT

Apparatus for collapsing steam tubes for removal from a steam boiler includes a plurality of gripping arms for engaging the end of a steam tube in the wall of a steam boiler. The arms are mounted about a central axis for pivotal movement of the distal ends thereof toward and away from the steam tube. The tube is engaged by gripping fingers at the distal end of the arms for engaging the steam tube between the wall of the boiler and the flared end of the tube. The arms are pivoted inwardly toward the central axis by the camming action of a plate through which the arms extend. The plate bears against the arms and cams then toward the central axis. The plate is moved by an actuator mounted on a fluid driven piston within a cylinder.

5 Claims, 6 Drawing Figures

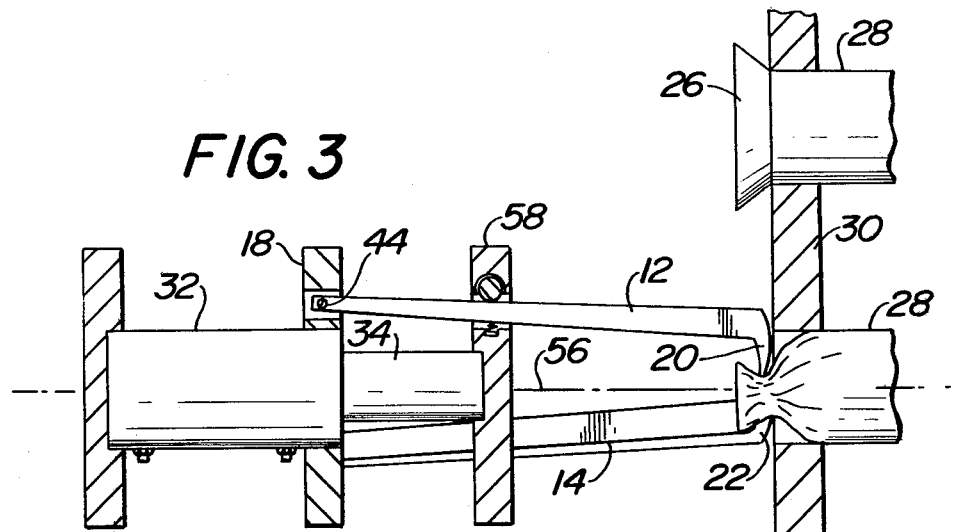
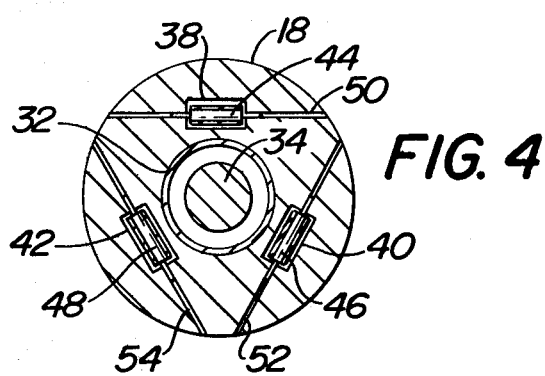
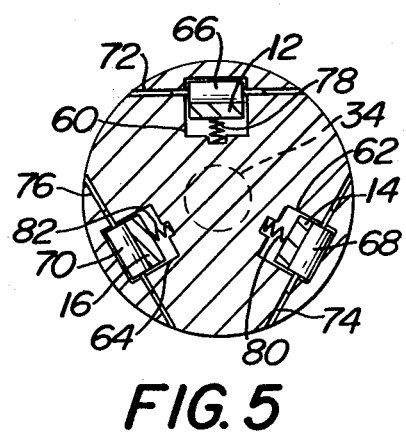
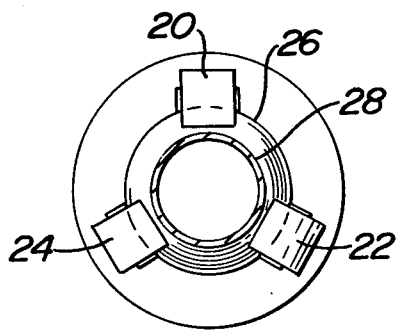

APPARATUS FOR COLLAPSING STEAM TUBES FOR REMOVAL FROM A STEAM BOILER

This invention relates to apparatus for collapsing steam tubes for removal from steam boilers. More particularly, the present invention relates to an apparatus for rapidly collapsing steam tubes so that they can be quickly removed from the wall of a boiler in which they had been tightly fitted.

It is often necessary to replace the steam tubes in large industrial boilers. These tubes are ordinarily force-fitted within openings in the walls of the boiler and their removal can be quite difficult. Typically, the flared end of the tubes is cut off with a blade mounted on a jackhammer. Then, the remaining portion of the tubes are cut, twisted or otherwise forced out of the holes in the wall in which they are fitted. This is time consuming and difficult work.

The present invention seeks to provide an improved apparatus for quickly removing steam tubes from the wall of a boiler. In accordance with the present invention, gripping arms are provided for engaging the tubes between the flared end thereof and the wall and for collapsing the tubes so that they can be readily removed from the wall.

In accordance with the present invention, a plurality of gripping arms are pivotally mounted around a central axis. The arms pivot toward and away from the central axis and are provided with gripping fingers at their distal end for engaging the steam tube. A movable plate is provided. This plate is positioned between the pivot point and the gripping fingers and includes a plurality of holes through which the arms extend. The plate is moved along the central axis by an actuator connected to a piston within a fluid cylinder. A surface within each hole bears against the gripping arms to force them to pivot toward the central axis thereby engaging the tube with the gripping fingers and collapsing the same.

The gripping arms are released from the tube by moving the plate back toward the pivot point.

It therefore is an object of the present invention to provide a new and improved apparatus for collapsing tubes for removal from a steam boiler.

It is another object of the present invention to provide pivotally mounted gripping arms for engaging a steam tube and collapsing the same for removal from the steam boiler.

It is yet another object of the present invention to provide improved means for causing pivotably mounted gripping arms to move toward a central axis so that fingers at the distal end thereof will engage and collapse a steam tube within the wall of a boiler.

For the purpose of illustrating the invention, there is shown in the drawings a form which is presently preferred; it being understood, however, that this invention is not limited to the precise arrangements and instrumentalities shown.

FIG. 3 is a side elevational view similar to FIG. 2 showing the arms after having collapsed a tube.

FIG. 4 is a transverse sectional view taken along the line 4—4 in FIG. 2.

FIG. 5 is a transverse sectional view taken along the line 5—5 in FIG. 2.

FIG. 6 is a transverse sectional view taken along the line 6—6 in FIG. 2.

Figure 1:
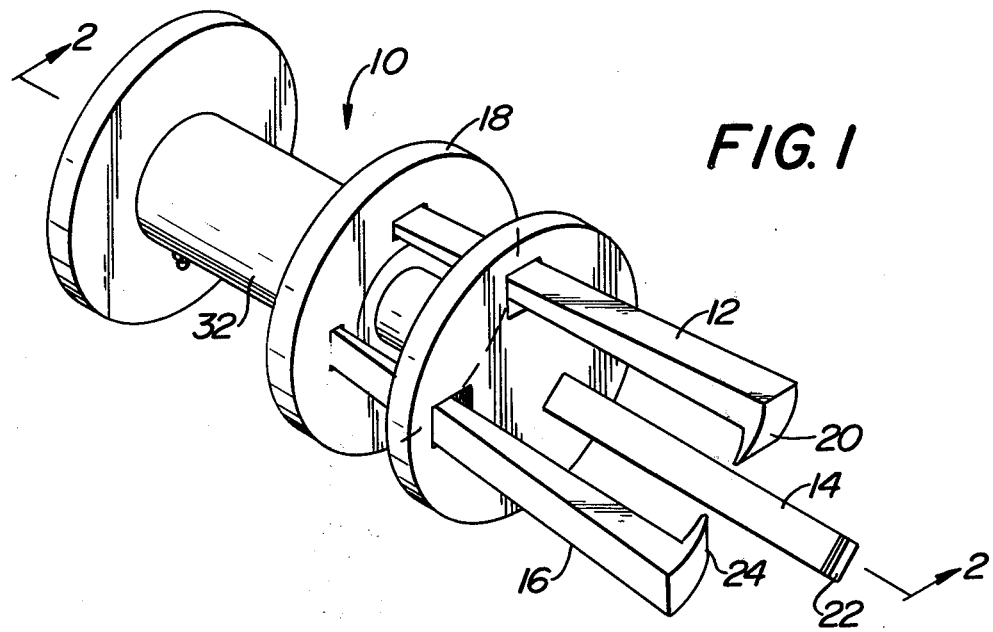
FIG. 1 is a perspective view of the apparatus for collapsing steam tubes in accordance with the present invention.
Figure 2:
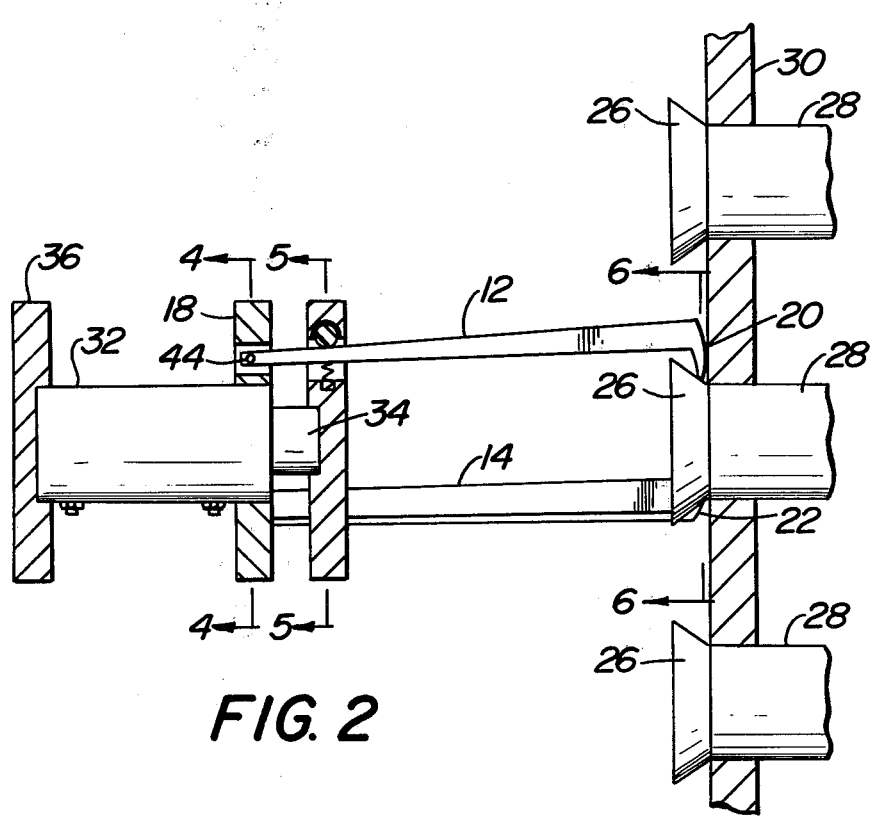
FIG. 2 is a side elevational view, partially in section, taken along the line 2—2 in FIG. 1 showing the apparatus in engagement with a steam tube.

Referring to the drawings in detail, wherein like numerals indicate like elements, there is shown in FIG. 1 an apparatus for collapsing steam tubes for removing them from steam boilers designated generally as 10. As shown, the apparatus 10 includes three gripping arms 12, 14 and 16 which are pivotably attached to the plate 18 as best shown in FIGS. 2 and 3. Although the apparatus 10 is shown with three arms 12, 14 and 16, it should be understood that the apparatus could include more than three arms or even two arms if they are opposed to each other and provided with properly shaped gripping fingers.

Each of the arms 12, 14 and 16 is provided with a gripping finger 20, 22 and 24, respectively. Each of the gripping fingers 20, 22 and 24 depends from the distal end of its respective gripping arm and is knife-shaped in cross-section so that it can readily force its way between the wall 30 of the boiler and the flared or bell-shaped portion 26 of the steam tubes 28. This is best illustrated in FIG. 2. Although the fingers 20, 22 and 24 are shown as being integral with the gripping arms 12, 14 and 16, they could be made detachable so that varying types of shapes for the gripping fingers can be interchangeably fixed to the gripping arms.

The plate 18 is mounted on the cylinder 32 for the purpose of providing a fixed mounting for the gripping arms 12, 14 and 16. A backing plate for bracing the apparatus 10 is also mounted on the rearward end of the cylinder 32 as shown.

As best shown in FIGS. 3 and 4, the plate 18 is provided with three rectangular openings 38, 40 and 42 within which the pivoted ends of the gripping arms 12, 14 and 16 are pivotably supported by pins 44, 46 and 48 which are mounted in journal openings 50, 52 and 54. As illustrated in FIGS. 3 and 4, the openings 38, 40 and 42 are substantially larger than the ends of the gripping arms 12, 14 and 16 positioned within them so that they can freely pivot toward and away from a central axis indicated by the phantom line 56. More particularly, the pins 44, 46 and 48 are positioned normal to and at equal radial distances from the central axis 56 so that the gripping fingers 20, 22 and 24 at the end of their respective gripping arms 12, 14 and 16 are at all times equally spaced from the central axis 56.

As indicated in FIGS. 2 and 3, the gripping arms 12, 14 and 16 extend generally along the central axis 56 and are pivotably moved toward and away from it by reciprocating the cam plate 58 which is mounted on the actuator 34. Actuator 34 is fixed to a piston (not shown) within the cylinder 32.

Although the cylinder 32 is illustrated as a hydraulic cylinder for reciprocating the actuator 34, it should be understood that other motive means can be used such as a pneumatic cylinder or motor means such as an electric motor and appropriate gearing. The cylinder 32 can be controlled by any appropriate hydraulic supply and control system which is known to those skilled in the art and it therefore need not be illustrated herein.

The cam plate 58 is provided with three rectangular openings 60, 62 and 64 through which the gripping arms 12, 14 and 16 extend. As shown in FIGS. 2, 3 and 4, the height of the openings 60, 62 and 64, as measured along the radius extending from the central axis 56, is substantially greater than the width of the gripping arms so that they can move radially toward and away from the central axis as the cam plate is reciprocated along that axis by the actuator 34. Mounted within each of the openings 60, 62 and 64 is a roller cam 66, 68 and 70. The roller cams 66, 68 and 70 are journaled within journal openings 72, 74 and 76 as illustrated in FIG. 5. As thus mounted, the roller cams 66, 68 and 70 bear against the outermost surface of the gripping arms 12, 14 and 16, respectively, and force them to move toward the central axis 56. As shown in FIG. 3, this action collapses the tube 28 when it is engaged by the gripping fingers 20, 22 and 24. The action not only collapses the tube at the point of engagement by the gripping fingers, it also tends to pull the tube away from the bore within the boiler wall 30 against which it is tightly fitted. This makes it relatively easy to thereafter withdraw the tube from the bore. Moreover, it is no longer necessary to spend a great deal of time cutting away the flare 26 as in previous techniques for removal of the tube 28.

To be certain that the gripping arms 12, 14 and 16 open and close the gripping fingers 20, 22 and 24 a sufficient distance to clear the flare 26 and yet collapse the tube 28, it is necessary to properly position the pins 44, 46 and 48 in respect to their distance from the central axis 56 and also properly angle the outermost surface of the gripping arms 12, 14 and 16 upon which the roller cams 66, 68 and 70 bear. As shown in FIGS. 2 and 3, this is accomplished by positioning the pivot point for the arms 12, 14 and 16 relatively close to the body of the cylinder 32 and by gradually thickening the gripping arms so that the outermost surface is at an increasing distance from the central axis thereby providing an appropriately shaped camming surface. It should be apparent that the same result can be achieved by modifications of the foregoing including changing the pivot points or the angle of the camming surface or both.

If desired, springs 78, 80 and 82 can be provided in the openings 60, 62 and 64 for biasing the gripping arms 12, 14 and 16 to their open position.

The present invention may be embodied in other specific forms without departing from the spirit or essential attributes thereof and, accordingly, reference should be made to the appended claims, rather than to the foregoing specification as indicating the scope of the invention.

I claim:
1. Apparatus for collapsing and removing tubes from a steam boiler, comprising:
a plurality of gripping arms spaced about and extending along a common central axis for engaging the end of a steam tube in the wall of a boiler;
each of said arms having a finger at the distal end thereof, each finger extending inwardly toward the central axis and being shaped for engaging the tube between the wall of the boiler and the outwardly flared end of a steam tube in said wall;
each of said arms being pivotably mounted on a support for movement of said fingers toward and away from said central axis;
a plate having a plurality of openings therein, said plate being positioned between the pivot point of said arms and the distal ends thereof with each arm extending through one of the openings in said plate;
said plate being mounted on an actuator for moving said plate along said central axis from a position forwardly of the pivot for said arms toward the distal ends thereof;
said plate including a bearing surface for bearing against said arms to cam them toward the central axis whereby said fingers engage a steam tube and collapse the same away from the wall of the boiler thereby permitting it to be removed; and
motive means for driving said actuator to move said plate along said central axis.

2. Apparatus for collapsing tubes in accordance with claim 1 wherein said motive means includes a cylinder and a fluid driven piston connected to said actuator.

3. Apparatus in accordance with claim 1 wherein each of said arms includes a bearing surface whose angularity relative to the central axis is such that the plate cams each arm toward the central axis as it is displaced from the position near the pivot point toward the distal end of said arms.

4. Apparatus in accordance with claim 1 wherein the bearing surface comprises a roller mounted within each opening through which the arms extend.

5. Apparatus in accordance with claim 1 wherein said actuator is connected to said plate at a location radially inwardly of said openings and radially inwardly of the pivots for said fingers.

* * * * *